(12) United States Patent
Ehrman et al.

(10) Patent No.: US 6,557,581 B2
(45) Date of Patent: May 6, 2003

(54) LIQUID FUEL TRAP

(75) Inventors: Moshe Ehrman, Halutza (IL); Udi Orenstein, Halutza (IL); Zohar Moalem, Halutza (IL); Vladimir Olshanetsky, Beer Sheva (IL)

(73) Assignee: Raviv Precision Injection Molding, Halutza (IL)

( * ) Notice: Subject to any disclaimer, the term of this patent is extended or adjusted under 35 U.S.C. 154(b) by 0 days.

(21) Appl. No.: 09/795,365

(22) Filed: Mar. 1, 2001

(65) Prior Publication Data

US 2002/0121300 A1 Sep. 5, 2002

(51) Int. Cl.[7] .............................................. F16K 24/04
(52) U.S. Cl. ........................................ 137/587; 137/202
(58) Field of Search ................................... 137/202, 587

(56) References Cited

U.S. PATENT DOCUMENTS

| | | | | |
|---|---|---|---|---|
| 3,614,960 A | * | 10/1971 | Pfrengle | 137/202 |
| 4,646,772 A | * | 3/1987 | Bergsma | 137/202 |
| 4,989,629 A | * | 2/1991 | Shirakawa | 137/202 |
| 5,277,217 A | * | 1/1994 | Kobayashi et al. | 137/202 |
| 6,062,250 A | * | 5/2000 | Takahashi | 137/202 |
| 6,336,466 B1 | * | 1/2002 | Ganachaud et al. | 137/202 |
| 6,405,747 B1 | * | 6/2002 | King et al. | 137/202 |
| 6,425,379 B2 | * | 7/2002 | Shimamura et al. | 137/202 |

FOREIGN PATENT DOCUMENTS

| | | | | |
|---|---|---|---|---|
| DE | 34 17 507 A1 | 11/1985 | | |
| DE | 199 25 728 A1 | 12/2000 | | |
| FR | 2 774 948 A1 | 8/1999 | | |
| GB | 2269375 A | * | 2/1994 | 137/202 |
| JP | 4-185534 A | * | 7/1992 | 137/202 |
| WO | WO 01/07806 A1 | * | 2/2001 | 137/202 |

* cited by examiner

Primary Examiner—Gerald A. Michalsky
(74) Attorney, Agent, or Firm—Birch, Stewart, Kolasch & Birch, LLP

(57) ABSTRACT

A liquid fuel trap device for a vehicle fuel tank, including a housing formed with a confined space with at least one inlet port. The at least one inlet port is connectable to a corresponding fuel valve. There is an outlet port connectable to a fuel vapor recovery system, and a fuel liquid discharge valve adapted for discharging liquid fuel from the space into the tank. The housing further includes a connecting arrangement for attaching the device on an inner surface of an upper wall of the fuel tank.

19 Claims, 3 Drawing Sheets

LIQUID FUEL TRAP

FIELD OF THE INVENTION

The present invention is in the field of vehicle fuel systems and more specifically it is concerned with a liquid fuel trap (at times referred to also as an expansion tank or an expansion canister).

BACKGROUND OF THE INVENTION

Vehicle fuel systems comprise, among others, a fuel tank fitted with a filler neck, a variety of fuel valves, a tubing for supplying fuel to the ignition system and a fuel vapor treating system (typically a carbon filter recovery system—canister) to which fuel vapor from the fuel tank flows and is then used for enriching the fuel mixture fed to the ignition system.

Fuel fluid (in the form, of liquid, droplets, spray and vapor) from the fuel tank flows via the one or more valves which are connected, via suitable tubing, to a liquid trap intermediate the fuel vapor recovery system, and the tank.

The liquid trap receives fuel fluid flowing from the fuel tank which flows at a relatively high velocity owing to pressure and temperature changes, and thus vapor flowing from the fuel tank carries along with it also a considerable amount of fuel liquid in the form of droplets (as a result of venturi effect). The liquid trap entraps the fuel liquid and allows fuel vapor flow towards the vapor recovery system. The fuel liquid then returns back to the fuel tank upon pressure decrease within the fuel tank.

A liquid fuel trap is important in those cases where the various valves fitted within the tank are internally installed, i.e. do not project from an upper wall of the tank, where siphons may be generated at tubes connecting the valves to the liquid trap. Such siphons interfere with venting the tank on the one hand and, on the other hand, interfere with draining the devices.

It is an object of the present invention to provide a liquid trap for a vehicle's fuel system, which expansion chamber is made of a plastic material and is adapted for fitting within the fuel tank.

SUMMARY OF THE INVENTION

The present invention calls for a liquid fuel trap usable in a vehicle's fuel system, which liquid trap is adapted for fitting within the fuel tank and comprises a relief valve for spontaneously discharging liquid fuel into the fuel tank, when the pressure with fuel tank drops below a predetermined threshold.

According to the present invention there is provided a liquid fuel trap device for a vehicle fuel tank, die device comprising a housing formed with a confined space wide at least one inlet port connectable to a corresponding at least one fuel valve, an outlet port connectable to a fuel vapor recovery system and a fuel liquid discharge valve adapted for discharging liquid fuel from said space into the tank, the housing further comprising a connecting arrangement for attaching the device on an inner surface of an upper wall of the fuel tank.

The liquid fuel trap device is typically made of an essentially impermeable material, though since the device is fitted for mounting within the fuel tank, this feature is not essential.

According to one particular embodiment, the confined space of the housing comprises at least a well portion, said well portion being lowest within the confined space, where the liquid discharge valve is a check valve fitted at a bottom most portion thereof.

The liquid discharge valve, according to one design, is a mushroom-type valve, and by another design is a spring-biased valve, such as, for example, a door-type valve, or a seat-type check valve.

According to an embodiment of the invention, liquid flow from the at least one inlet port is prevented from direct flowing or splashing to the outlet port. By one specific design there is a barrier member between the at least one inlet port and the outlet port. This effect may also be achieved by designing the at least one inlet port and the outlet port at different levels and axially diverted, i.e. not axially extending. Thus, the confined space may be formed with several unleveled chambers, where the inlet and outlet ports are fitted at different levels.

The device, according to one design, is attached to the fuel tank by a securing member formed on the housing and adapted for snap engagement with a connecting member extending from the upper wall of the fuel tank.

The present invention calls also for a fuel system comprising a fuel tank, at least one fuel valve, a fuel recovery system and a liquid fuel trap device located between the at least on fuel valves and the fuel recovery system said liquid trap device comprising a housing formed with a confined space with at lease one inlet port connectable to the corresponding at least one fuel valve, and outlet port connectable to the fuel vapor recovery system, a fuel liquid discharge valve adapted for discharging liquid fuel from said confined space into the tank, and a connecting arrangement for attaching the device on an inner surface of an upper wall of the fuel tank.

According to a specific design, the device is attached to the fuel tank by a connecting member extending from the upper wall of the fuel tank, said connecting member adapted for snap-engagement with a corresponding securing member formed on the housing of the device.

BRIEF DESCRIPTION OF THE DRAWINGS

In order to better understand the invention and to see how it may be carried out in practice, reference will now be made to the accompanying drawings, by way of example only in which.

DETAILED DESCRIPTION OF SPECIFIC EMBODIMENTS

Whilst some embodiments have been described and illustrated with reference to some drawings, the artisan, will appreciate that many variations are possible which do not depart from the general scope of the invention, mutatis mutandis.

Figure 1:
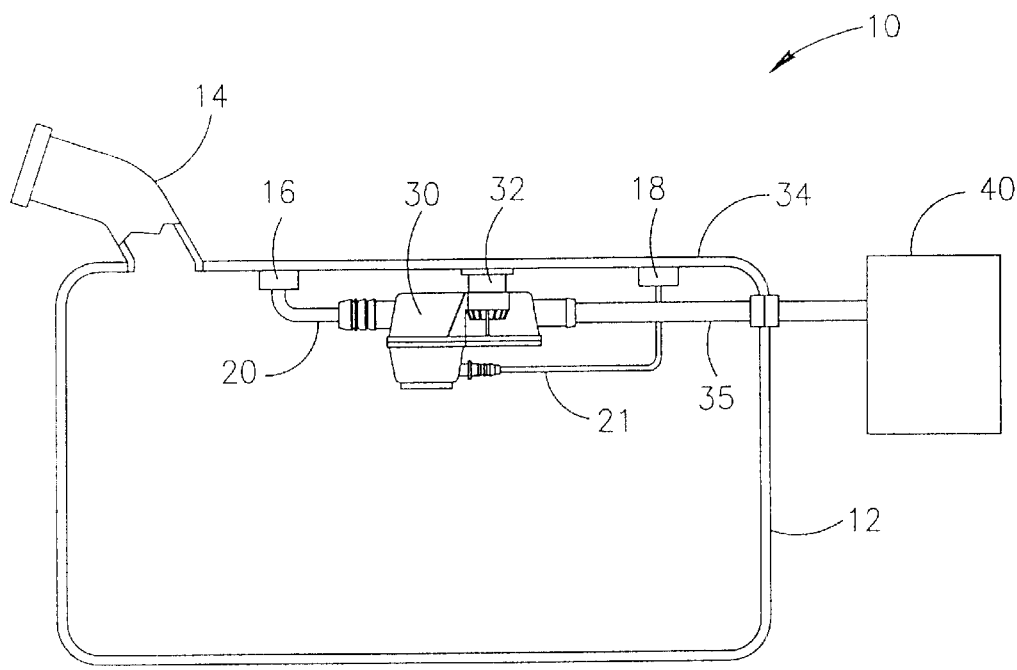
FIG. 1 is a schematic presentation illustrating a fuel system fitted with an liquid fuel trap according to the present invention.

FIG. 1 is a schematic illustration of a vehicle's fuel system generally designated 10 comprising several elements which are schematically illustrated, namely a fuel tank 12 fitted with a fuelling pipe 14, several valves 16 and 18, e.g. a roll-over valve, over-filing interdiction valve and a variety of other valves are possible, as known per se. The valves 16 and 18 are connected via suitable tubing designated 30 connected at 32 to an inside surface of an upper wall 34 of the fuel tank 12. it is desired to avoid formation of siphons in the tubes extending to and from the device, as such siphons interfere with venting the tank on the one hand and, on the other hand, interfere with draining the device.

Extending from the liquid fuel trap 30 there is a pipe 35 extending to a fuel vapor recovery system 40, typically a carbon fuel treating device known as "a canister".

Figure 2:
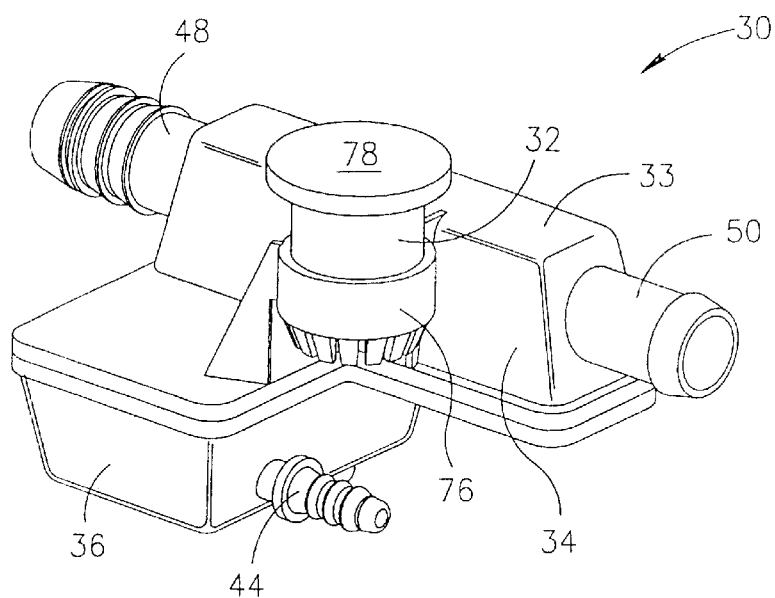
FIG. 2 is an isometric view of the liquid trap in accordance with the invention.
Figure 3:
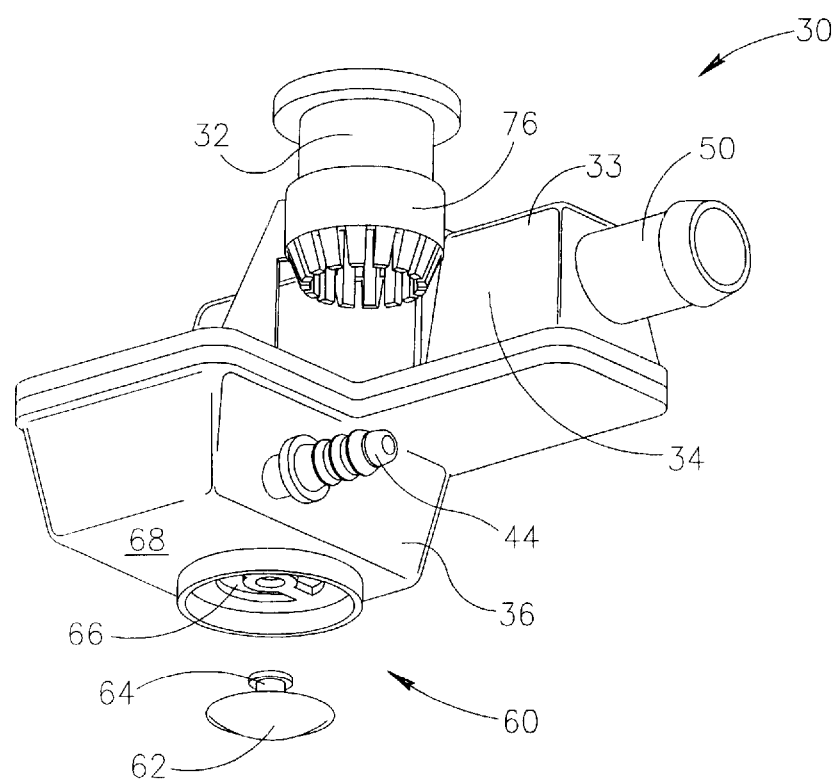
FIG. 3 is a bottom isometric view of the device seen in FIG. 2, partially exploded so as to visualize a discharge valve thereof.
Figure 4:
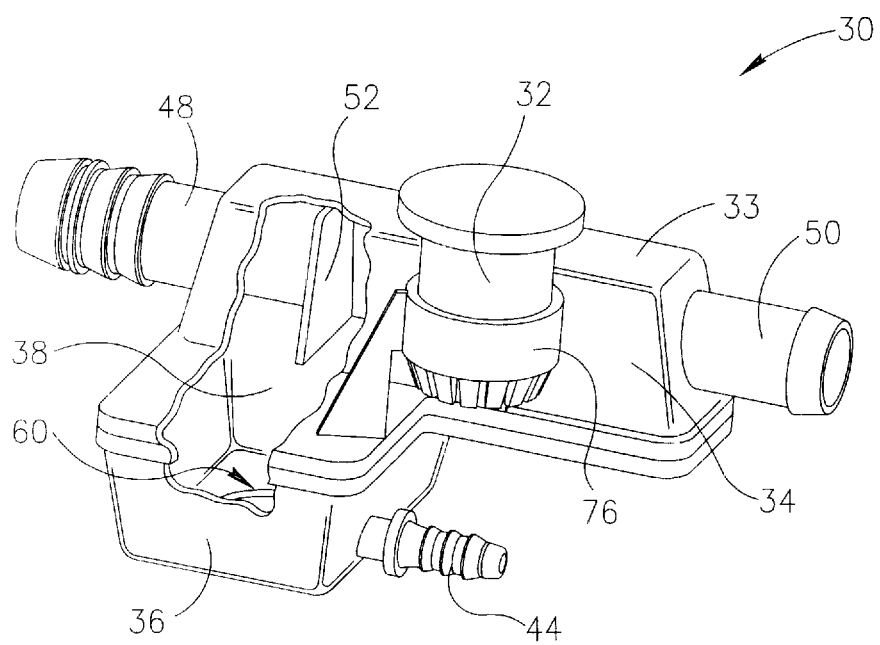
FIG. 4 is an isometric view of the liquid trap in accordance with the invention, partially sectioned so as to visualize a barrier wall in the confined space.

Further reference is now made to FIGS. 2 to 4 for understanding the specific construction of a liquid fuel trap 30 in accordance with the present invention. The device 30 comprises a housing 33 formed with an upper chamber 34 and a lower, well-like chamber 36 which together define a confined space 38. The lower chamber 36 is fitted with an inlet nipple 44 constituting a first inlet port connected by tube 21 to a valve 18 (see FIG. 1) and the upper chamber 34 is fitted with a second inlet nipple 48 constituting a second inlet port connectable via tube 20 to valve 16 (see FIG. 1). Connected to an opposite side of the upper chamber 34 there is an outlet nipple 50 connected via tube 35 to the vapor treating device 40 (see FIG. 1).

As can be seen in FIG. 4, die upper chamber 34 comprises a barrier wall 52 extending opposite the second inlet 48 thus preventing liquid from splashing from the inlet directly towards the outlet 50 and rather forcing it to flow into well-like chamber 36 where it will accumulate and discharge into the fuel tank by gravity through a discharge valve 60 and a lowermost portion of the lower chamber 36.

Figure 5:
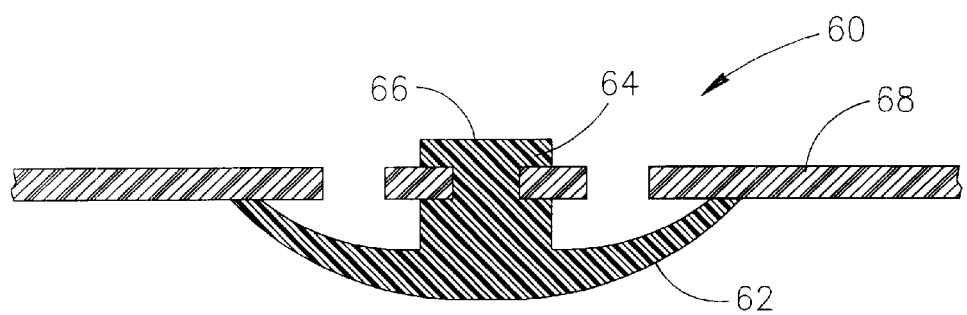
FIG. 5 is a local section of a base portion of the housing of the fuel trap, illustrating a mushroom-type discharge valve.

By one particular embodiment, illustrated in FIGS. 3 and 5, the discharge valve 60 is a one-way mushroom-type valve comprising a flexible mushroom-like diaphragm member 62 formed with a stem portion 64 snapingly received within a suitable receptacle 66 at a base wall 68 of the lower chamber 36. Liquid accumulating above the flexible diaphragm will eventually cause it to deform and discharge the liquid into the fuel tank.

Figure 6:
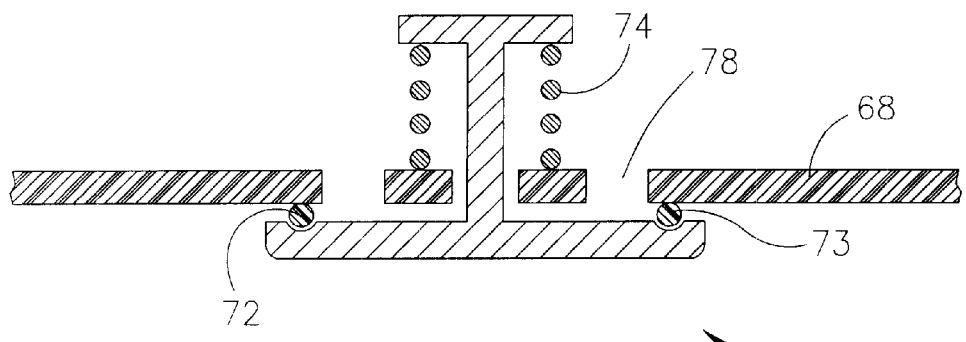
FIG. 6 is a local section of a base portion of the housing of the fuel trap, illustrating a spring biased type discharge valve.

Another embodiment of a discharge valve is illustrated in FIG. 6 wherein the bottom wall 68 of the lower chamber 36 accommodates a one-way valve 70 comprising a closure member 72 biased by coiled spring 74 into sealing engagement of the apertures 78 formed in wall 68, with a sealing gasket 73 provided for improved sealing engagement. The closing member 72 will displace to an open position, overcoming the force of coil spring 74 upon accumulation of a predetermined amount of fuel liquid within the chamber 36 and upon decrease of pressure within the fuel tank.

Figure 7:
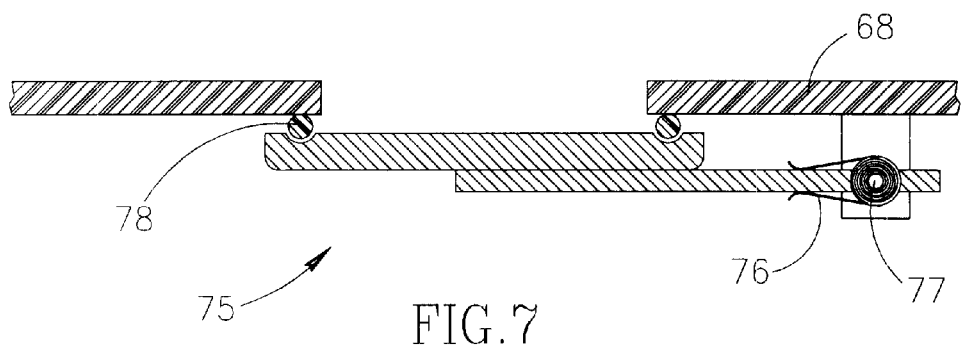
FIG. 7 illustrates still another embodiment of a discharge valve for use in a liquid trap according to lie present invention.

The embodiment of FIG. 7 illustrates another options for a discharge valve suitable for use in a liquid trap according to the present invention. The discharge valve is a door like closure designated 75, pivotally connected at 77 to the lower wall of the housing of the device arid being biased by spring 76 into sealing engagement, there being a gasket seal 78 for improved sealing.

Reverting now to FIGS. 2 to 4, it is noted that the housing 33 of the device 30 comprises a ring-like member 76 integrally formed with the housing 33 and adapted for snap engagement with a cylindrical stem member 32 (see FIG. 1) attached to a top wall surface 34 of fuel tank 12, e.g. by welding surface 78 or by other connecting methods desirably being non-permeable attachment means. Preferably, stem member 32 should be as short as possible, so as to ensure the device is installed as high as possible within the tank. However, this is only an embodiment for connecting the device within the tank. Other connecting options are possible too, setting as an example the arrangement disclosed in WO 01/07806.

What is claimed is:

1. A liquid fuel trap device for a vehicle fuel tank, the device, comprising:

a housing formed with a confined space provided with at least one inlet port connectable to a corresponding at least one fuel valve, with an outlet port, which is in communication with a fuel vapor recovery system, a fuel liquid discharge valve effective to discharge liquid fuel from the confined space into the fuel tank, the housing including a connecting arrangement for attaching the device within the fuel tank on an inner surface of an upper wall of the fuel tank.

2. The liquid fuel trap device according to claim 1, wherein the housing is formed of at least two members formed in an injection molding process, said members being welded to one another.

3. The liquid fuel trap device according to claim 1, wherein the at least one inlet port is situated below the outlet port.

4. The liquid fuel trap device according to claim 1, wherein the confined space constitutes an expansion chamber to allow fuel vapor expansion and accumulation of fuel liquid therein.

5. The liquid fuel trap device according to claim 4 wherein the expansion chamber is sized so as to significantly reduce flow velocity of the fuel fluid entering the device via the at least one inlet port.

6. The liquid fuel trap device according to claim 1, wherein the housing is formed with a well portion at a lowermost portion of the housing the discharge valve being fitted at said well portion of the housing.

7. The liquid fuel trap device according to claim 1, wherein the at least one inlet port and the outlet port are fitted with a connection nipple connectable to a tube, said connecting nipples being integrally formed with the housing.

8. The liquid fuel trap device according to claim 1, wherein liquid fuel is discharged from the confined space into the fuel tank through', the discharge valve, by gravity force.

9. The liquid fuel trap device according to claim 8, wherein the discharge valve is a mushroom-type check valve.

10. The liquid the trap device according to claim 8, wherein the discharge valve is a spring biased type check valve.

11. The liquid fuel trap according device to claim 1, wherein the outlet port is formed above the at least one inlet port, so as to prevent liquid splash thereto.

12. The liquid fuel trap device according to claim 1, wherein intermediate the inlet port and the outlet port there is formed a barrier wall, so as to prevent liquid splash thereto.

13. The liquid fuel trap device according to claim 1, wherein the housing is snappingly attached to the wall of the fuel tank.

14. A fuel system comprising:
a fuel tank,
at least one fuel valve,
a fuel recovery system and a liquid fuel trap device extending between the at least one fuel valve and the fuel recovery system,
said liquid fuel trap device including a housing formed with a confined space with at least one inlet port connectable to the corresponding at least one fuel valve, with an outlet port, which is in communication with the fuel vapor recovery system,
said liquid fuel trap device further is provided with a fuel liquid discharge valve effective to discharge liquid fuel from said confined space into the fuel tank, and with a connecting arrangement for attaching the device within the fuel tank on an inner surface of an upper wall of the fuel tank.

15. The fuel system according to claim 14, wherein the discharge valve is located at a well portion of the housing formed at a lowermost portion of the housing, said discharge valve is adapted for discharging liquid fuel into the tank by gravity.

16. The fuel system according to claim 14, wherein the outlet port is situated above the at least one inlet port so as to prevent liquid splash thereto.

17. The fuel system according to claim 14, wherein intermediate the inlet port and the outlet port the housing is formed with a barrier wall, so as to prevent liquid splash thereto.

18. The fuel system according to claim 14, wherein the housing of the liquid fuel trap device is snappingly attached to the wall of the fuel tank.

19. The fuel system according to claim 14, wherein the liquid fuel trap is located entirely within the fuel tank and being in immediate communication with the fuel recovery system,
the at least one fuel and liquid discharge valves are located entirely within the fuel tank and outside of the liquid fuel trap wherein one of the inlet ports of the fuel trap device is located below the outlet port.

* * * * *

UNITED STATES PATENT AND TRADEMARK OFFICE
CERTIFICATE OF CORRECTION

PATENT NO. : 6,557,581 B2
DATED : May 6, 2003
INVENTOR(S) : Ehrman et al.

It is certified that error appears in the above-identified patent and that said Letters Patent is hereby corrected as shown below:

<u>Title page,</u>
Item [73], Assignee, please correct the assignee's name as follows:
-- Raval-Agriculture Cooperative Societies Ltd. --

Signed and Sealed this

Eighth Day of June, 2004

JON W. DUDAS
*Acting Director of the United States Patent and Trademark Office*